US009870497B2

(12) United States Patent
Quattrini (10) Patent No.: US 9,870,497 B2
(45) Date of Patent: Jan. 16, 2018

(54) WINDOW-RETAINING, PROTECTIVE CAP FOR SCANNING DEVICE

(71) Applicant: Datalogic IP Tech S.r.l., Lippo di Calderara di Reno (IT)

(72) Inventor: Paolo Quattrini, Sala Bolognese (IT)

(73) Assignee: Datalogic IP Tech S.r.l., Bologna (IT)

(*) Notice: Subject to any disclaimer, the term of this patent is extended or adjusted under 35 U.S.C. 154(b) by 0 days.

(21) Appl. No.: 14/972,410

(22) Filed: Dec. 17, 2015

(65) Prior Publication Data

US 2017/0177916 A1 Jun. 22, 2017

(51) Int. Cl.
 *G06K 7/10* (2006.01)
 *G06K 7/14* (2006.01)

(52) U.S. Cl.
 CPC ....... *G06K 7/10722* (2013.01); *G06K 7/1413* (2013.01); *G06K 2007/10524* (2013.01)

(58) Field of Classification Search
 CPC ............. G06K 7/10722; G06K 7/1413; G06K 2007/10524; G06K 7/10881; G06K 7/1098
 USPC ............ 235/462.41, 462.43, 462.45, 462.47, 235/472.01
 See application file for complete search history.

(56) References Cited

U.S. PATENT DOCUMENTS

| 5,512,740 A | * | 4/1996 | Hone | G06K 7/1098 235/462.45 |
| 5,663,551 A | * | 9/1997 | Hone | G06K 7/1098 235/462.38 |
| 6,088,174 A | * | 7/2000 | Cox | G02B 27/0006 359/819 |
| 6,913,201 B1 | * | 7/2005 | Wagner | H05K 5/02 235/472.01 |
| 7,281,663 B2 | | 10/2007 | Schmidt et al. | |
| 7,624,924 B2 | | 12/2009 | Byun et al. | |
| 8,167,210 B2 | | 5/2012 | Liu et al. | |
| 2005/0023358 A1 | * | 2/2005 | Byun | G07G 1/0045 235/462.45 |
| 2010/0065452 A1 | * | 3/2010 | Ottl | G03B 11/041 206/316.1 |

* cited by examiner

*Primary Examiner* — Paultep Savusdiphol
(74) *Attorney, Agent, or Firm* — Shook, Hardy & Bacon L.L.P.

(57) ABSTRACT

A protective cap for a scanning device is provided that retains a device exit window in a fixed position relative to a scan engine while reducing the likelihood of a collision between the scan engine and the exit window when the scanning device is subjected to mechanical stress. Also provided are scanning devices having such a protective cap. The protective cap includes first, second and third portions. The first portion is coupled with an outwardly-facing surface of the exit window and operates to retain the exit window against a scan engine support. The second portion is coupled with the scan engine support and operates to keep the scan engine at a fixed distance from the exit window. The third portion is coupled with an enclosure for the scanning device and operates to secure the exit window and the scan engine at a fixed position with respect to the enclosure.

22 Claims, 5 Drawing Sheets

FIG. 5 ular, the present invention relates to a protective cap
WINDOW-RETAINING, PROTECTIVE CAP FOR SCANNING DEVICE

TECHNICAL FIELD

The present invention relates to a protective cap for a mechanical assembly, for instance, a scanning device. More particularly, the present invention relates to a protective cap for a scanning device that retains a device exit window in a fixed position relative to a scan engine.

BACKGROUND OF THE INVENTION

Two-dimensional (2D) scan engines are used in products such as retail store scanners to translate a target image (e.g., a barcode) into a digital format that can be interpreted and analyzed by a computer. Scan engines typically include an illumination system, a plurality of imaging pixel arrays (such as charge coupled device (CCD) or CMOS arrays), a lens, a sensor, and a decoder. In general, a scan engine scans the black and white elements of a target image (e.g., a barcode) by the illumination system illuminating the image with a light that passes through a transparent exit window and onto the target image. Light reflected from the target image typically is focused back through the exit window and through the lens, located on or near the scan engine, such that the focused light is concentrated onto one or more of the pixel arrays. The sensor detects the reflected light and generates an analog signal that is sent to the decoder. The decoder interprets that signal, validates the image, and converts it into text which may be delivered by the scan engine to a computer system holding a database of information against which the text may be compared.

In some situations, it is desirable to have the exit window positioned relatively close to the scan engine, for instance, to avoid reflections to the imaging pixel arrays which can distort the received image information. For instance, in some situations, it is desirable to have less than or equal to one millimeter of separation between the window and the scan engine. In such cases, however, it is not desirable to fix the positioning of the exit window as it is typically done in scanning devices having greater separation between the exit window and the scan engine. That is, it is not desirable to fix the positioning of the exit window to a rigid support structure using glue, bi-adhesive tape, ultrasonic welding, or the like, or to rigidly couple the exit window to the device enclosure. In the case of too weak tolerances of the parts of the scanning device assembly, such traditional means of fixing the exit window may make the assembly un-mountable. Further, the closeness of the exit window and the scan engine could transmit shocks in the case of mechanical stresses such as upon dropping of the scanning device.

These cases may be managed by a precise assembly having rigid assembly parts which are able to maintain constant the distance between the exit window and the scan engine while avoiding collision of these parts in the case of mechanical shocks.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Additional objects, advantages, and novel features of the invention will be set forth in part in the description which follows, and in part will become apparent to those skilled in the art upon examination of the following, or may be learned by practice of embodiments of the invention.

Embodiments of the present invention generally relate to a protective cap for a mechanical assembly that retains one mechanical component in a fixed position relative to another mechanical component comprising the assembly. More particularly, embodiments of the present invention relate to a protective cap for a scanning device that retains a device exit window in a fixed position relative to a scan engine. Embodiments of the present invention further relate to a mechanical assembly (for instance, a scanning device) having a protective cap in accordance with aspects described herein. In accordance with embodiments hereof, the protective cap is integrally formed of rubber and includes a first portion, a second portion, and a third portion. The first portion is coupled with an outwardly-facing surface of a first mechanical component (e.g., the scanning device exit window) and operates to retain the first mechanical component (e.g., the exit window) pressed against a second mechanical component (e.g., the scan engine support of the scanning device). The second portion is coupled with the second mechanical component (e.g., the scan engine support of the scanning device) and operates to keep a third mechanical component (e.g., the scan engine of the scanning device) at a fixed distance from the first mechanical component (e.g., the scanning device exit window). The third portion is coupled with an enclosure for the mechanical assembly (e.g., the scanning device) and operates to secure the first mechanical component (e.g., the scanning device exit window) and the third mechanical component (e.g., the scan engine of the scanning device) at a fixed position with respect to the enclosure.

An integrally-formed rubber protective cap in accordance with aspects hereof allows for fixed relative positioning of mechanical components comprising a mechanical assembly (for instance, the exit window and the scan engine of a scanning device), even in cases of close positioning (e.g., less than or equal to one millimeter), and still maintains an elastic, shock-absorbing arrangement which aids in avoiding collision of the components (e.g., the exit window and the scan engine) when the mechanical assembly (e.g., scanning device) is subjected to mechanical stress.

BRIEF DESCRIPTION OF THE SEVERAL VIEWS OF THE DRAWING

In the accompanying drawings which form a part of the specification and which are to be read in conjunction therewith, and in which like reference numerals are used to indicate like parts in the various views.

DETAILED DESCRIPTION OF THE INVENTION

The subject matter of embodiments of the present invention is described with specificity herein to meet statutory requirements. But the description itself is not intended to define what is regarded as the invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Embodiments of the present invention generally relate to a protective cap for a mechanical assembly. Throughout the following description, the referenced mechanical assembly is a scanning device, for instance, an image scanning device such as a barcode scanner. It will be understood and appreciated, however, by those having ordinary skill in the art that the inventive aspects disclosed herein are equally applicable to mechanical assemblies other than scanning devices. Reference to a "scanning device" is merely for ease of description and is not intended to limit the scope of embodiments of the present invention.

The protective cap is integrally formed of rubber and is designed to retain an exit window of the scanning device in a fixed position relative to a scan engine that is housed within the scanning device enclosure. Embodiments of the present invention further relate to a scanning device having a protective cap that retains the exit window in relative position to the scan engine, in accordance with aspects described herein. In accordance with embodiments hereof, the protective cap includes first, second and third portions that cooperate with one another to secure the exit window in position. The first portion is coupled with an outwardly-facing surface of the exit window and operates to retain the exit window against the scan engine support. The second portion is coupled with the scan engine support and operates to keep the scan engine at a fixed distance from the exit window. The third portion is coupled with the scanning device enclosure and operates to secure the exit window and the scan engine at a fixed position with respect to the enclosure.

A protective cap in accordance with aspects hereof allows for fixed relative positioning of the exit window and the scan engine, even in cases of close positioning (e.g., less than or equal to one millimeter). A protective cap in accordance with aspects hereof further maintains an elastic, shock-absorbing arrangement which aids in avoiding collision of the exit window and the scan engine when the scanning device is subjected to mechanical stress such as inadvertent drops.

In a first aspect, a protective cap for use with a scanning device is provided. The scanning device includes a scan engine, a scan engine support structure, an exit window and a device enclosure. The protective cap includes a first portion coupled with an outwardly-facing surface of the exit window, a second portion coupled with the scan engine support structure, and a third portion coupled with the device enclosure. The first, second and third portions cooperate to secure the exit window in position at a fixed distance relative to the scan engine when the scanning device is assembled.

In another aspect, a scanning device is provided. The scanning device includes a scan engine, a scan engine support structure, an exit window, a device enclosure that cooperates with the exit window to define an interior space that houses the scan engine and the scan engine support, and a protective cap. The protective cap includes a first portion coupled with an outwardly-facing surface of the exit window, a second portion coupled with the scan engine support structure, and a third portion coupled with the device enclosure that cooperates with the first portion and the second portion to secure the exit window in position at a fixed distance relative to the scan engine.

In yet another aspect, a protective cap for use with a scanning device is provided. The protective cap includes a rubber support body that includes a first portion, a second portion and a third portion that cooperate to secure an exit window of the scanning device in position at a fixed distance relative to a scan engine supported by a scan engine support structure. The first portion is coupled with an outwardly-facing surface of the exit window and applies a retaining force to the exit window such that the exit window is pressed against the scan engine support structure when the scanning device is assembled. The second portion includes a protruded area that is placed in a grove of the scan engine support structure such that the second portion and the scan engine support structure are coupled. The third portion is coupled with an outer enclosure of the scanning device.

In still another aspect, a protective cap for use with a mechanical assembly having first, second and third mechanical components and an assembly enclosure that at least partially encloses the first, second, and third mechanical components is provided. The protective cap includes a first portion coupled with an outwardly-facing surface of the first mechanical component; a second portion coupled with the second mechanical component; and a third portion coupled with the assembly enclosure, the first, second and third portions cooperating to secure the first mechanical component in position at a fixed distance relative to the third mechanical component when the mechanical assembly is assembled.

Figure 1:
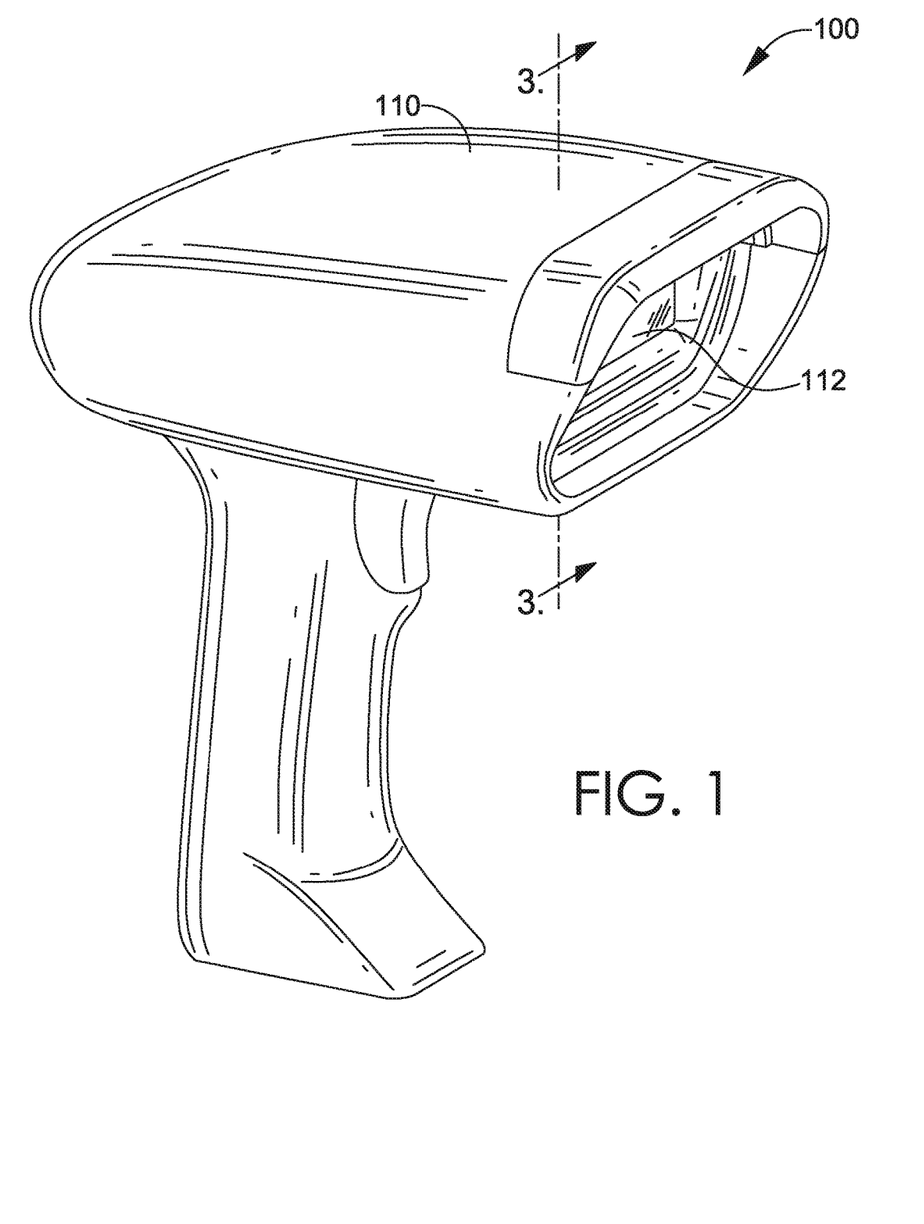
FIG. 1 depicts a schematic diagram of an exemplary hand-held scanning device, in accordance with embodiments of the present invention.

Turning now to FIG. 1, depicted is an exemplary scanning device 100 in accordance with embodiments of the present invention. The scanning device 100 includes a device enclosure 110 (generally formed, by way of example only, from rigid plastic) and a transparent exit window 112 (generally formed, by way of example only, from transparent glass or plastic) that cooperate to form an interior space (not shown in FIG. 1) that houses, at least, a scan engine and a scan engine support structure, both of which are more fully described below with reference to FIGS. 3-7. The scanning device 100 illustrated in FIG. 1 is merely one example of a scanning device for which aspects of the present invention may be employed. It will be understood and appreciated by those having ordinary skill in the art that the size, shape, orientation and the like of the scanning device are not intended to limit the scope of embodiments hereof. Further, though the exemplary scanning device 100 is a handheld device, aspects of the present invention are equally applicable to pen or wand scanners, stationary scanners, fixed-position scanners, PDA scanners, automatic readers, cordless/wireless scanners, and the like.

Figure 2:
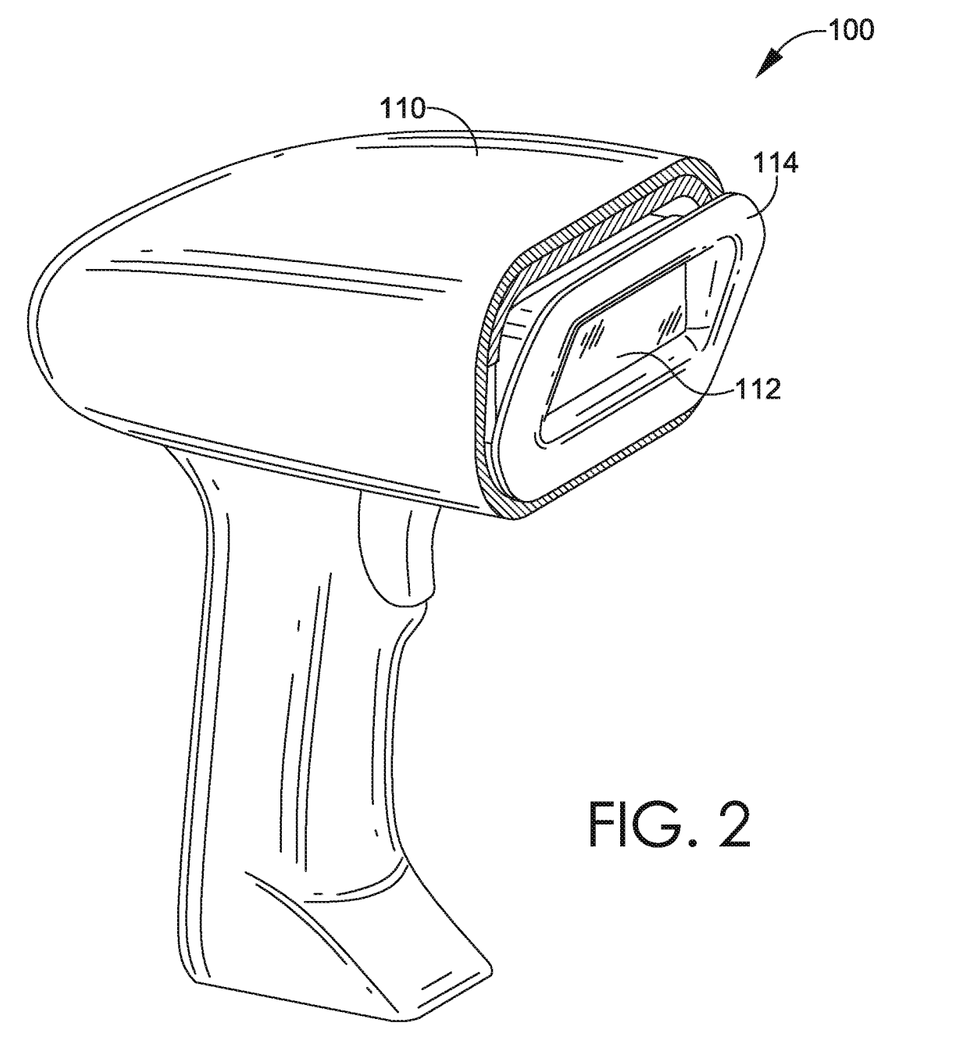
FIG. 2 depicts a schematic diagram of the exemplary hand-held scanning device of FIG. 1 having a portion of the enclosure removed to permit viewing of the protective cap, in accordance with embodiments of the present invention.

With reference to FIG. 2, a view of the scanning device 100 having a portion of the device enclosure 110 removed is illustrated. In the depicted view, it can be seen that the scanning device 100 additionally includes a protective cap 114. In the illustrated embodiment, the protective cap 114 surrounds the perimeter of the exit window 112, as more fully described below.

Figure 3:
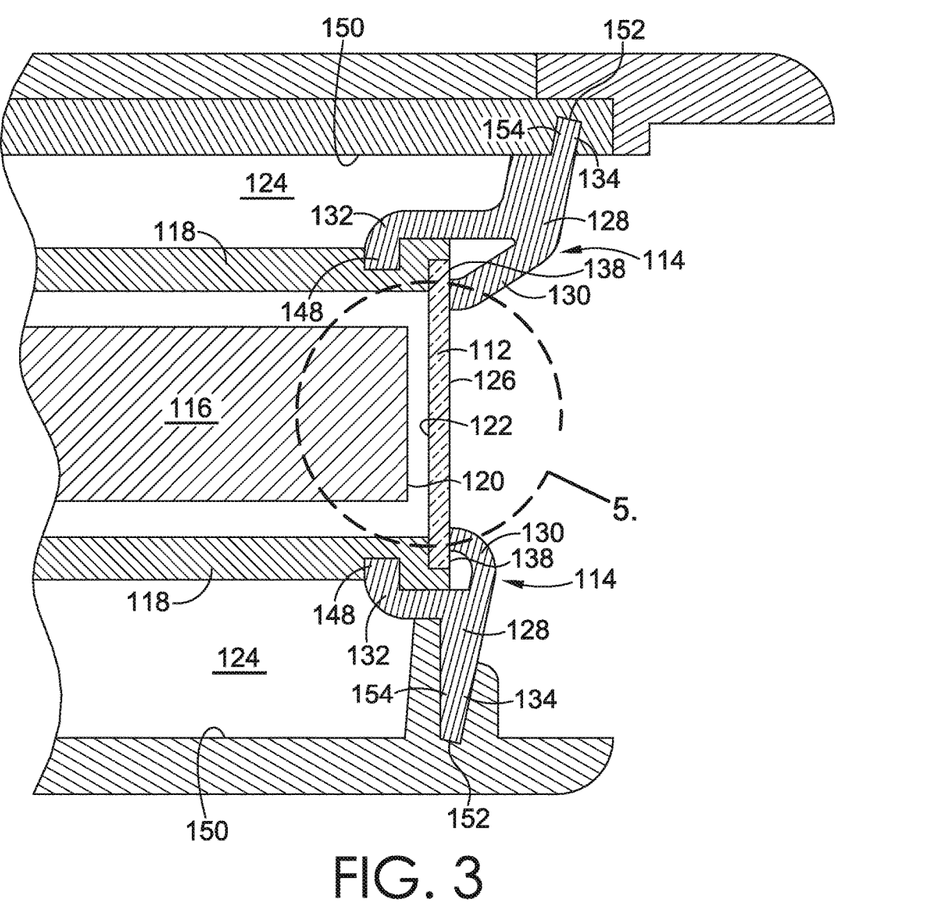
FIG. 3 depicts a cross-sectional view of the scanning device of FIG. 1, the cross-section taken along line 3.-3. thereof, in accordance with embodiments of the present invention.

Turning now to FIG. 3, depicted is a cross-sectional view FIG. 3 depicts a cross-sectional view of the scanning device of FIG. 1, the cross-section taken along line 3.-3. thereof, for ease of viewing the internal components and the inventive aspects hereof. The internal components that are relevant to embodiments of the present invention include a scan engine 116 and a scan engine support structure 118. The scan engine 116 is supported by the scan engine support structure 118, the scan engine support structure 118 surrounding the scan engine 116 around a lateral perimeter thereof. One end 120 of the scan engine 116 that is not protected by the scan engine support structure 118 and instead is protected by the exit window 112. The exit window 112 is coupled with at least a portion of the scan engine support structure 118 such that there is a separation between an inwardly-facing surface 122 of the exit window 112 and the end 120 of the scan engine 116. As used herein, the term "inwardly-facing surface" refers to a surface of the exit window 112 that is positioned to face the interior space 124 created by the exit window 112 and the device enclosure 110. That is, the inwardly-facing surface 122 faces and is exposed to the interior of the scanning device 100. By way of contrast, as used herein, the term "outwardly-facing surface" refers to a surface 126 of the exit window 112 that is positioned to face the environment surrounding the scanning device 100. That is, the outwardly-facing surface 126 faces away from the interior of the scanning device 100.

Though illustrated herein as a rectangular structure, it will be understood and appreciated by those having ordinary skill in the art that the exit window 112 may be comprised of any desired shape so long as it may be operationally positioned with respect to the scanning device 100. Similarly, the shapes of the scan engine 116, scan engine support structure 118, protective cap 114, and the like, as illustrated herein are merely exemplary and are not intended to limit the scope of embodiments of the present invention in any way.

Figure 4:
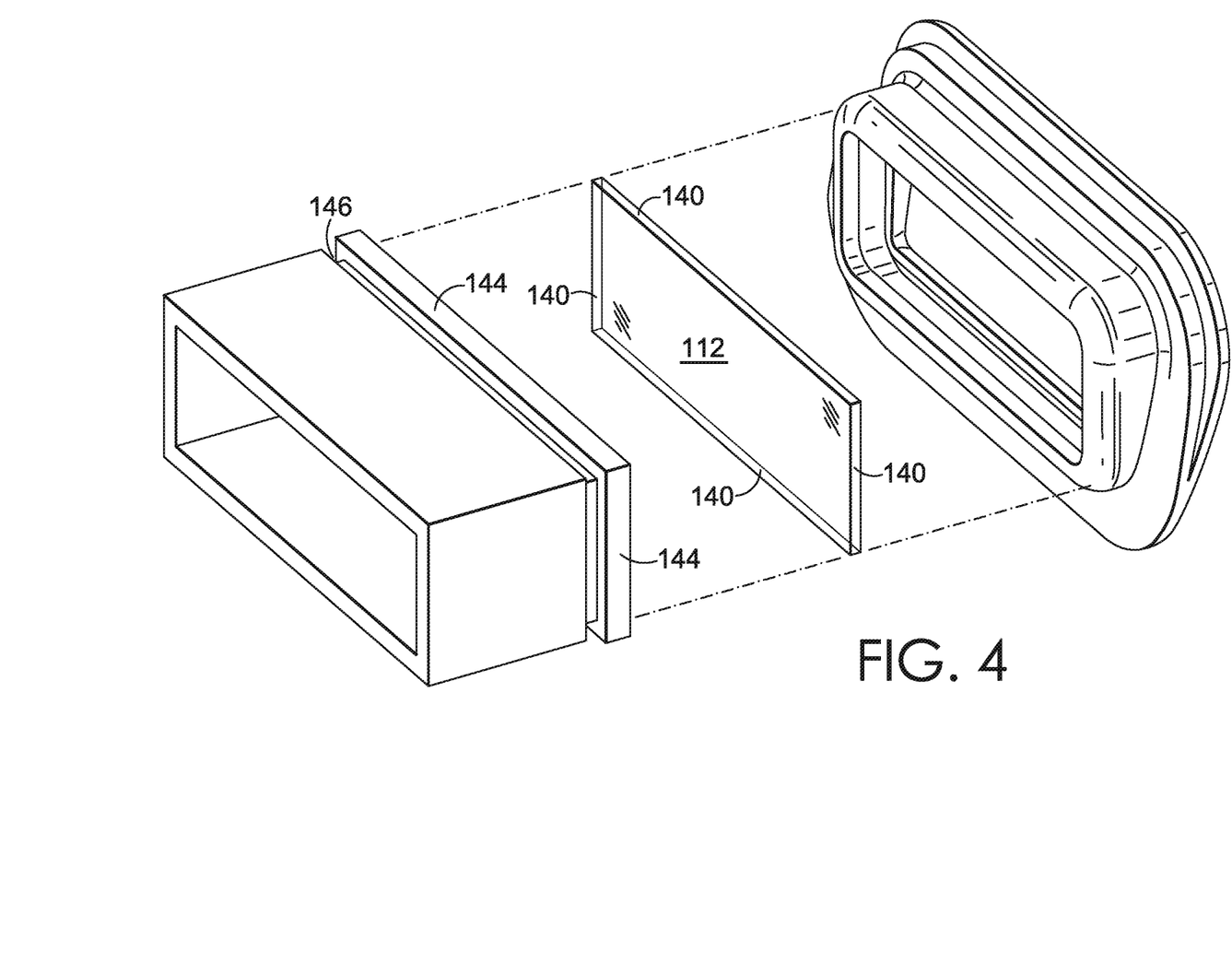
FIG. 4 depicts an exploded view illustrating the assembly of a protective cap in cooperation with an exit window and scan engine support, in accordance with embodiments of the present invention.

The protective cap 114 comprises a rubber support body 128 that includes three portions: a first portion 130, a second portion 132, and a third portion 134. The first portion 130 of the protective cap 114 is coupled with the outwardly-facing surface 126 of the exit window 112 and cooperates with the other portions of the rubber support body 128 to retain the exit window 112 against the scan engine support structure 118. In embodiments, the first portion 130 of the protective cap 114 is coupled with the outwardly-facing surface 126 of the exit window 112 proximate an edge 138 of the exit window 112 and around a perimeter 140 (see FIG. 4) thereof. It will be understood and appreciated by those having ordinary skill in the art, however, that the protective cap 114 may be coupled with the outwardly-facing surface 126 of the exit window 112 at less than the entire perimeter 140, for instance, at two positionally-opposed edge regions thereof (e.g., a "top" and a "bottom" region), in accordance with aspects hereof. Further, it will be understood and appreciated that the first portion 130 of the protective cap 114 may be coupled with the outwardly-facing surface 126 of the exit window 112 at a location that is not proximate the exit window edge 138, so long as there is sufficient unobstructed area of the exit window 112 to permit operation of the scanning device 100. Any and all such variations, and any combination thereof, are contemplated to be within the scope of embodiments of the present invention.

When the scanning device 100 in accordance with embodiments hereof is assembled, the first portion 130 of the rubber support body 128 of the protective cap 114 operates to apply a retaining force to the exit window 112 such that the exit window 112 is pressed against the scan engine support structure 118.

Figure 5:
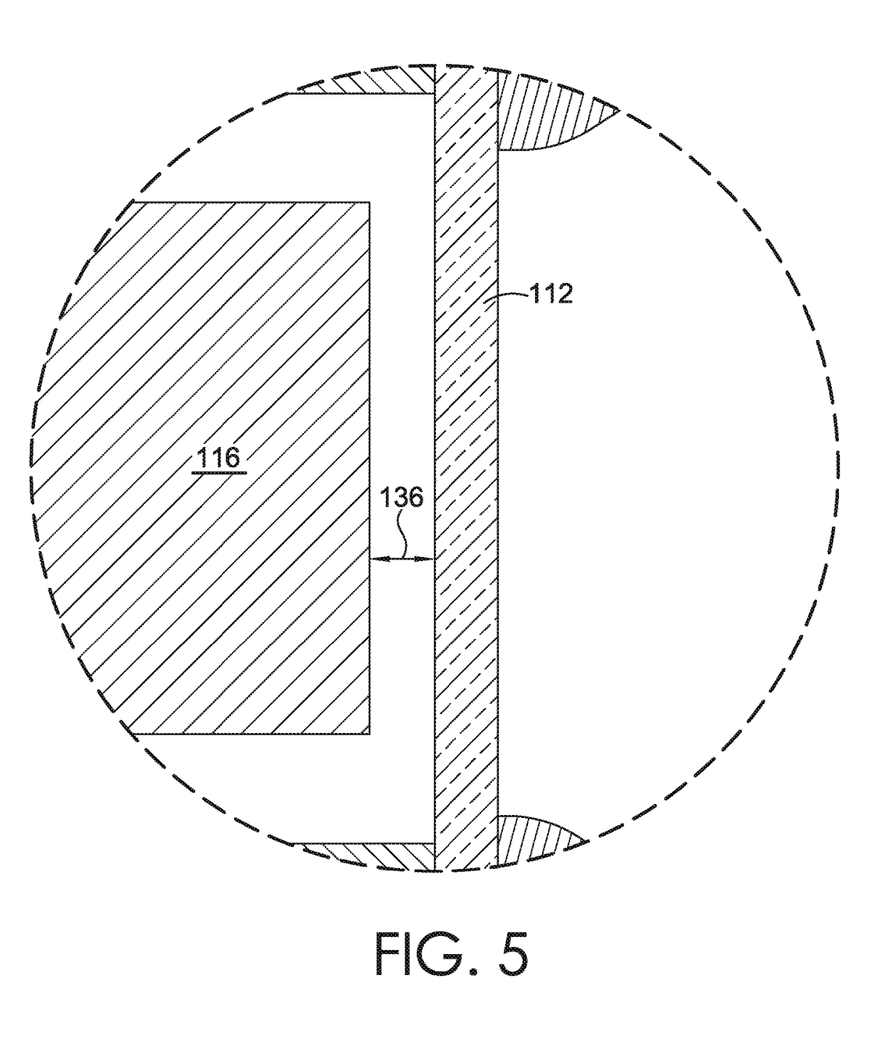
FIG. 5 depicts a magnified view of the area encircled by reference numeral 5. in the view of FIG. 3, in accordance with embodiments of the present invention.

The second portion 132 of the protective cap 114 is coupled with the scan engine support structure 118 and cooperates with the other portions of the rubber support body 128 to maintain the scan engine 116 at a fixed distance 136 (see FIG. 5) from the inwardly-facing surface 122 of the exit window 112. In embodiments, the fixed distance is less than or equal to one millimeter of separation between the exit window 112 and the scan engine 116. In embodiments, the second portion 132 of the protective cap 114 is coupled with the scan engine support structure 118 proximate an edge 142 of the scan engine support structure 118 and around a perimeter 144 (see FIG. 4) thereof. It will be understood and appreciated by those having ordinary skill in the art, however, that the protective cap 114 may be coupled with the scan engine support structure 118 at less than the entire perimeter 144, for instance, at two positionally-opposed edge regions thereof (e.g., a "top" and a "bottom" region), in accordance with aspects of the present invention. Further, it will be understood and appreciated that the second portion 132 of the protective cap 114 may be coupled with the scan engine support structure 118 at a location that is not proximate the edge 142 thereof, so long as there is sufficient maintenance of the relative positioning of the scan engine support structure 118 and the exit window 112 as described herein. For instance, the second portion 132 may be coupled with the scan engine support structure 118 at a location that is proximate the edge 138 of the exit window 112 when the scanning device 100 is assembled. Any and all such variations, and any combination thereof, are contemplated to be within the scope of embodiments of the present invention.

In embodiments of the present invention, the scan engine support structure 118 includes a groove 146 (see FIG. 4) in an outer surface thereof and the second portion 132 of the rubber support body 128 of the protective cap 114 includes a protruded area 148. In such embodiments, the scan engine support structure 118 and the second portion 132 of the rubber support body 128 may be coupled by placement of the protruded area 148 within the groove 146.

The third portion 134 of the protective cap 114 is coupled with an interior surface 150 of the scanning device enclosure 110 and operates to secure the exit window 112 at a fixed position with respect to the enclosure 110. In embodiments, the third portion 134 of the protective cap 114 is coupled with the scanning device enclosure 110 around and proximate a perimeter 140 of the exit window 112 when the scanning device 100 is assembled. In embodiments, the scanning device enclosure 110 includes a groove 152 in the interior surface 150 thereof and the third portion 134 of the rubber support body 128 of the protective cap 114 includes a protruded area 154. In such embodiments, the scanning device enclosure 110 and the third portion 134 of the rubber support body 128 may be coupled by placement of the protruded area 154 within the groove 152.

A protective cap 114 formed in accordance with aspects hereof allows for fixed relative positioning of the exit window 112 and the scan engine 116, even in cases of close positioning (e.g., less than or equal to one millimeter). A protective cap 114 integrally formed of rubber, in accordance with aspects hereof further maintains an elastic, shock-absorbing arrangement which aids in avoiding collision of the exit window 112 and the scan engine 116 when the scanning device 100 is subjected to mechanical stresses such as drops.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Having thus described the invention, what is claimed is:

1. A protective cap for use with a scanning device having a scan engine, a scan engine support structure, an exit window, and a device enclosure that cooperates with the exit window to define an interior space that encloses the scan engine and the scan engine support structure, the protective cap comprising:
   a first portion that contacts at least a portion of an outwardly-facing surface of the exit window;
   a second portion coupled with the scan engine support structure, the second portion including at least a portion thereof that is positioned within the interior space; and
   a third portion coupled with the device enclosure, the first, second and third portions cooperating to secure the exit window in position at a fixed distance relative to the scan engine when the scanning device is assembled.

2. The protective cap of claim 1, wherein the fixed distance is less than or equal to one millimeter.

3. The protective cap of claim 1, wherein the first portion contacts at least the portion of the outwardly-facing surface of the exit window proximate an edge of the exit window and around a perimeter thereof, and wherein the first portion applies a retaining force to the exit window such that the exit window is pressed against the scan engine support structure when the scanning device is assembled, and such that absent the protective cap, the exit window would cease contact with the scan engine support structure.

4. The protective cap of claim 1, wherein the second portion is coupled with the scan engine support structure around a perimeter thereof.

5. The protective cap of claim 4, wherein the second portion is coupled with the scan engine support structure proximate the exit window when the scanning device is assembled.

6. The protective cap of claim 1, wherein the second portion includes a protruded area, wherein the scan engine support structure includes a groove, and wherein the second portion is coupled with the scan engine support structure via placement of the protruded area within the groove.

7. The protective cap of claim 1, wherein the third portion is coupled with the device enclosure around and proximate a perimeter of the exit window when the scanning device is assembled.

8. The protective cap of claim 1, wherein the third portion includes a protruded area, wherein the device enclosure includes a groove, and wherein the third portion is coupled with the device enclosure via placement of the protruded area within the groove.

9. The protective cap of claim 1, wherein the cap is comprised of rubber.

10. A scanning device, comprising;
    a scan engine;
    a scan engine support structure;
    an exit window;
    a device enclosure that cooperates with the exit window to define an interior space that encloses the scan engine and the scan engine support structure;
    and
    a protective cap, the protective cap including:
    a first portion that contacts at least a portion of an outwardly-facing surface of the exit window;
    a second portion coupled with the scan engine support structure, the second portion including at least a portion thereof that is positioned within the interior space; and
    a third portion coupled with the device enclosure that cooperates with the first portion and the second portion to secure the exit window in position at a fixed distance relative to the scan engine.

11. The scanning device of claim 10, wherein the fixed distance is less than or equal to one millimeter.

12. The scanning device of claim 10, wherein the first portion of the protective cap contacts at least the portion of the outwardly-facing surface of the exit window proximate an edge of the exit window and around a perimeter thereof, and wherein the first portion applies a retaining force to the exit window such that the exit window is pressed against the scan engine support structure, and such that absent the protective cap, the exit window would cease contact with the scan engine support structure.

13. The scanning device of claim 10, wherein the second portion of the protective cap is coupled with the scan engine support structure around a perimeter thereof and proximate a perimeter of the exit window.

14. The scanning device of claim 10, wherein the second portion of the protective cap includes a protruded area,
    wherein the scan engine support structure includes a groove,
    and wherein the second portion of the protective cap is coupled with the scan engine support structure via placement of the protruded area within the groove.

15. The scanning device of claim 10, wherein the third portion of the protective cap is coupled with the device enclosure around and proximate a perimeter of the exit window.

16. The scanning device of claim 10,
    wherein the third portion includes a protruded area,
    wherein the device enclosure includes a groove,
    and wherein the third portion is coupled with the device enclosure via placement of the protruded area within the groove.

17. The scanning device of claim 10, wherein the protective cap is comprised of rubber.

18. A protective cap for use with a scanning device, comprising:
    a rubber support body that includes:
    a first portion that contacts at least a portion of an outwardly-facing surface of an exit window of the scanning device, the first portion applying a retaining force to the exit window such that the exit window is pressed against a scan engine support structure when the scanning device is assembled and such that absent the protective cap, the exit window would cease contact with the scan engine support structure;
    a second portion having a protruded area, the protruded area being placed in a grove of the scan engine support structure such that the second portion and the scan engine support structure are coupled; and
    a third portion coupled with a scanning device enclosure, the scanning device enclosure cooperating with the exit window to define an interior space that encloses a scan engine and the scan engine support structure, wherein the first, second and third portions cooperate to secure the exit window in position at a fixed distance relative to the scan engine supported by the scan engine support structure, and wherein the second portion includes at least a portion thereof that is positioned within the interior space.

19. The protective cap of claim 18, wherein the fixed distance is less than or equal to one millimeter.

20. The protective cap of claim 18,
wherein the first portion contacts at least the portion of the outwardly-facing surface of the exit window of the scanning device proximate an edge of the exit window and around a perimeter thereof,
wherein the second portion is coupled with the scan engine support structure around a perimeter thereof and proximate the exit window,
and wherein the third portion is coupled with the scanning device enclosure around and proximate the perimeter of the exit window.

21. A protective cap for use with a mechanical assembly having first, second and third mechanical components and an assembly enclosure that at least partially encloses the first, second, and third mechanical components, the protective cap comprising:

a first portion that contacts at least a portion of an outwardly-facing surface of the first mechanical component;

a second portion coupled with the second mechanical component, the second portion including at least a portion thereof that is positioned within an interior space defined by the first mechanical component and the assembly enclosure; and a third portion coupled with the assembly enclosure, the first, second and third portions cooperating to secure the first mechanical component in position at a fixed distance relative to the third mechanical component when the mechanical assembly is assembled.

22. The protective cap of claim 21,
wherein the second portion includes a protruded area,
wherein the second mechanical component includes a groove,
and wherein the second portion is coupled with the second mechanical component via placement of the protruded area within the groove.

\* \* \* \* \*